(12) United States Patent
Waszak et al.

(10) Patent No.: US 8,067,847 B1
(45) Date of Patent: Nov. 29, 2011

(54) VARIABLE SPEED MACHINE ASSEMBLY AND METHOD FOR MAKING THE SAME

(75) Inventors: Michal-Wolfgang Waszak, Munich (DE); Jan Hemmelmann, Munich (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/970,406

(22) Filed: Dec. 16, 2010

(51) Int. Cl.
*F03D 9/00* (2006.01)
*H02P 9/00* (2006.01)
(52) U.S. Cl. ............................................. 290/44; 290/55
(58) Field of Classification Search .................... 290/43, 290/44, 54, 55; 322/37
See application file for complete search history.

(56) References Cited

U.S. PATENT DOCUMENTS

| | | | |
|---|---|---|---|
| 6,448,735 B1 * | 9/2002 | Gokhale et al. ............... 318/700 |
| 6,741,059 B2 * | 5/2004 | Gokhale et al. ............... 318/700 |
| 7,425,771 B2 * | 9/2008 | Rivas et al. ..................... 290/44 |
| 7,518,257 B2 | 4/2009 | Guey et al. |
| 7,622,815 B2 * | 11/2009 | Rivas et al. ..................... 290/44 |
| 7,863,868 B2 * | 1/2011 | Xu et al. .......................... 322/44 |
| 8,018,083 B2 * | 9/2011 | Larsen et al. ................... 290/44 |
| 2008/0054641 A1 * | 3/2008 | Voss ................................ 290/44 |
| 2008/0157529 A1 * | 7/2008 | Rivas et al. ..................... 290/44 |
| 2011/0150497 A1 * | 6/2011 | Hemmelmann et al. ...... 398/141 |

OTHER PUBLICATIONS renewableenergyworld.com/.../perman...Eize De Vries, "Permanent Solution? The Application of Permanent Magnet Generators is Gaining Ground in the Wind Turbine Industry", Published Apr. 8, 2010, RenewableEnergyWorld.com, copyright 1999-2010, pp. 1-7.
renewableenergyworld.com.../excited-...Eize De Vries, "Excited About Power Quality: Generator Innovations at Ingeteam", Published May 1, 2008, RenewableEnergyWorld.com, copyright 1999-2010, pp. 1-5.

* cited by examiner

*Primary Examiner* — Nicholas Ponomarenko
(74) *Attorney, Agent, or Firm* — Ann M. Agosti; Armstrong Teasdale LLP

(57) ABSTRACT

A variable speed machine assembly includes an input shaft, a variable speed magnetically geared generator coupled to the input shaft, an electrical machine coupled to the input shaft, and a power converter coupled to the variable speed magnetically geared generator and the electrical machine. The power converter is configured to use electrical power output by the electrical machine to control a frequency of power output by the variable speed magnetically geared generator.

20 Claims, 3 Drawing Sheets

VARIABLE SPEED MACHINE ASSEMBLY AND METHOD FOR MAKING THE SAME

BACKGROUND OF THE INVENTION

The embodiments described herein relate generally to a variable speed machine and, more particularly, to a variable speed machine assembly for use with a fluid turbine, such as a wind turbine.

At least some known wind turbines include machines for converting variable speed mechanical input from blades of the wind turbine into electric power that is compliant with an electrical grid. For example, some known wind turbines include a doubly fed induction generator (DFIG) for converting the variable speed mechanical input. The DFIG includes a converter that has a rating that is a percentage of a rated capacity of the wind turbine, such as about 35% of rated capacity. Such a converter is also referred to as a partial-rated converter. Further, the DFIG includes slip rings and may have less reactive power control and/or lower efficiency, as compared to other variable speed machines.

At least some other known wind turbines include permanent magnet generators (PMG) that have a higher efficiency than at least some known DFIGs. PMGs include a converter at the rated capacity, also referred to as a full-rated converter. Typically, full-rated converters include complex power electronics, which have disadvantages, such as large size, high maintenance requirements, and/or high cost, as compared to partial-rated converters.

BRIEF DESCRIPTION OF THE INVENTION

In one aspect, a variable speed machine assembly is provided. The variable speed machine assembly includes an input shaft, a variable speed magnetically geared generator coupled to the input shaft, an electrical machine coupled to the input shaft, and a power converter coupled to the variable speed magnetically geared generator and the electrical machine. The power converter is configured to use electrical power output by the electrical machine to control a frequency of power output by the variable speed magnetically geared generator.

In another aspect, a turbine is provided. The turbine includes a main shaft assembly including an input shaft, at least one blade coupled to the main rotor shaft and configured to rotate the main rotor shaft, and a variable speed machine assembly coupled to the main rotor shaft. The variable speed machine assembly includes a variable speed magnetically geared generator coupled to the input shaft, an electrical machine coupled to the input shaft, and a power converter coupled to the variable speed magnetically geared generator and the electrical machine. The power converter is configured to use electrical power output by the electrical machine to control a frequency of power output by the variable speed magnetically geared generator.

In yet another aspect, a method for making a variable speed machine assembly is provided. The method includes coupling a variable speed magnetically geared generator to an input shaft and a power grid, coupling an electrical machine to the input shaft, and coupling a power converter to the variable speed magnetically geared generator and the electrical machine. The power converter is configured to use electrical power output by the electrical machine to control a frequency of power output to the grid by the variable speed magnetically geared generator.

BRIEF DESCRIPTION OF THE DRAWINGS

FIG. 1 is a perspective view of an exemplary wind turbine.

FIG. 2 is a schematic view of an exemplary variable speed machine assembly that may be used with the wind turbine shown in FIG. 1.

FIG. 3 is a cross-sectional view of an exemplary first machine that may be used with the variable speed machine assembly shown in FIG. 2.

DETAILED DESCRIPTION OF THE INVENTION

The variable speed machine assembly described herein converts variable speed mechanical power into constant frequency electric power. The machine assembly includes a power converter and two machines operating on a single shaft. The first machine is based on a planetary magnetic gearbox and includes two sets of windings and one rotor. The second machine includes a rotor, a stator, and one set of windings. The second machine can be referred to herein as an "exciter" and includes a permanent magnet rotor or a permanent magnet stator. The power converter is configured to transfer electrical power between one of the winding sets of the first machine and the winding set of the second machine. Notably, a rating of the power converter is a fraction of a rating capacity of a turbine with which the variable speed machine assembly is used. As such, the power converter is a partial-rated converter. In one embodiment, the power converter has a capacity of between about 4% and about 15% of the rated capacity.

The first machine described herein is configured to split mechanical input power between the two sets of windings therein. A first portion of the power is directly fed to a grid at constant frequency by a first set of the two sets of windings. A second winding of the two sets of windings is connected to the power converter. The power converter is also connected to terminals of the second machine. The power converter is configured to adjust a frequency of the second machine to a frequency that maintains a grid terminal frequency at a substantially constant value at the first machine. As such, the herein-described embodiments eliminate the slip rings used in DFIGs, while including a partial-rated power converter.

Although a wind turbine embodiment is illustrated herein for purposes of example, the variable speed machine assembly disclosed herein is useful with other types of variable speed mechanical inputs, such as, for example, a marine hydrokinetic energy device.

Figure 1:
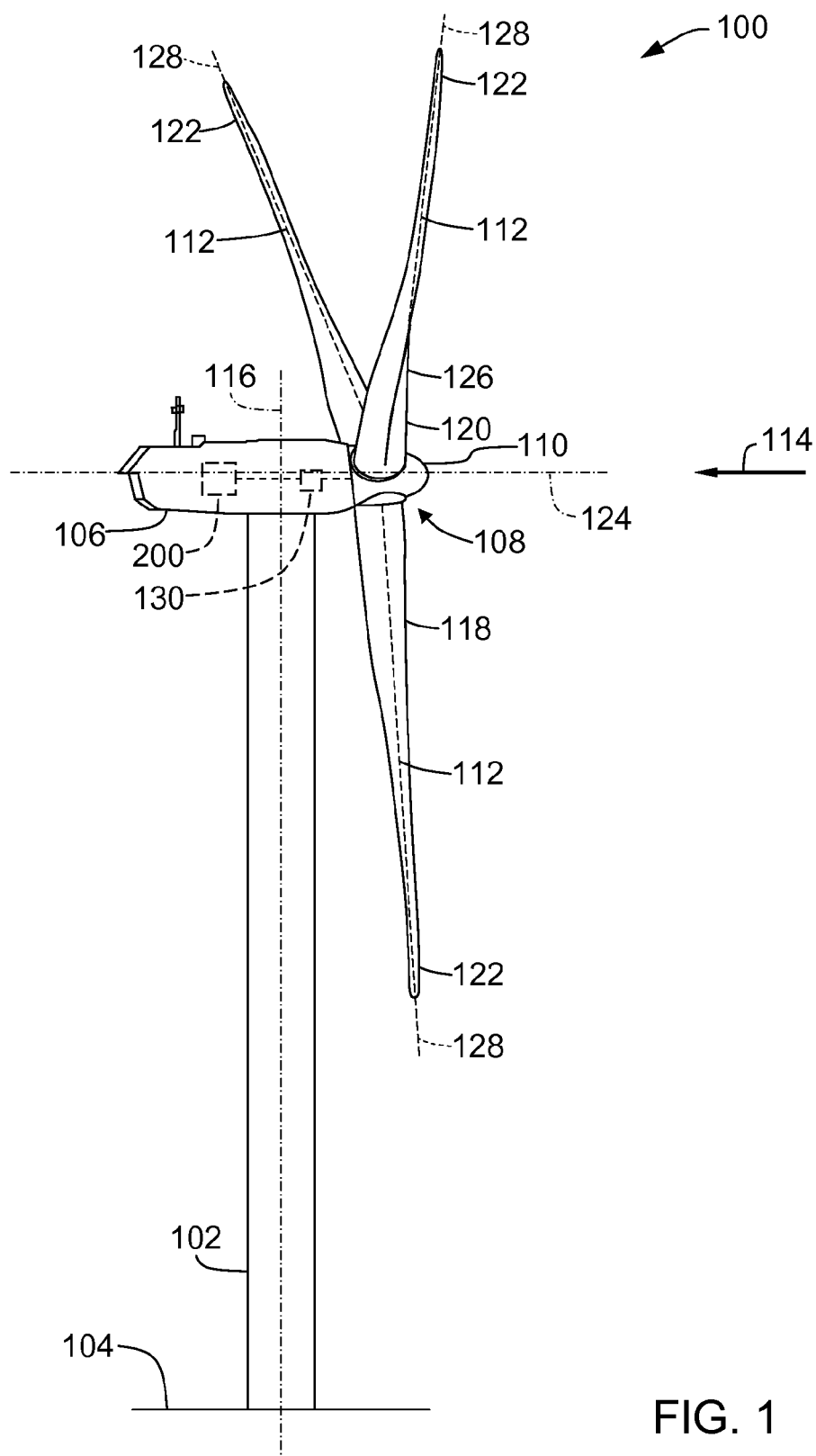
FIGS. 1-3 show exemplary embodiments of the system and method described herein.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a main shaft assembly 108 is coupled to nacelle 106. Main shaft assembly 108 includes a rotatable hub 110 and a plurality of rotor blades 112 coupled to hub 110. In the exemplary embodiment, main shaft assembly 108 includes three rotor blades 112. Alternatively, main shaft assembly 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating main shaft assembly 108, thereby transferring kinetic energy from wind 114 into usable mechanical energy, and subsequently, electrical energy. Main shaft assembly 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of main shaft assembly 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually. Further, wind turbine 100 includes a main gearbox 130 and a variable speed machine assembly 200 within nacelle 106. In the exemplary embodiment, main shaft assembly 108 includes a first shaft 132 (shown in FIG. 2) that extends into main gearbox 130 and a second shaft 134 (shown in FIG. 2) extends through variable speed machine assembly 200. As such, second shaft 134 is also referred to herein as input shaft 134.

Figure 2:
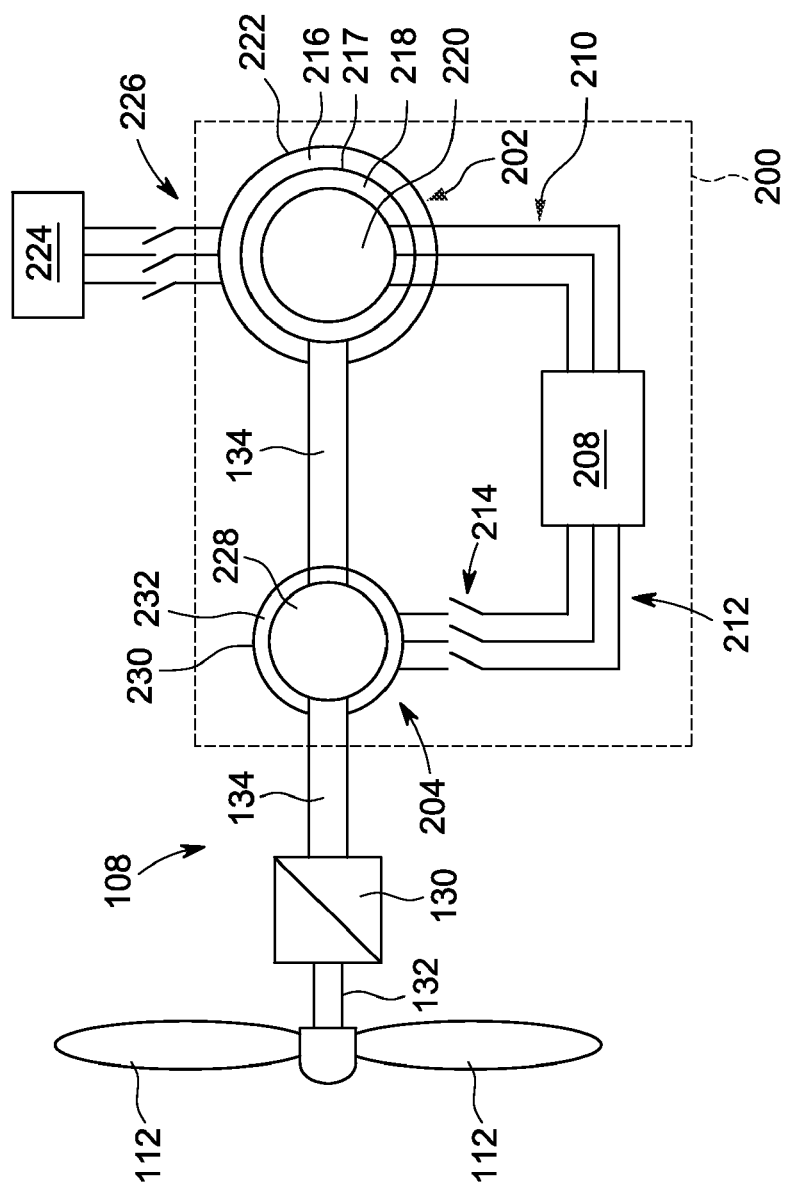
Figure 3:
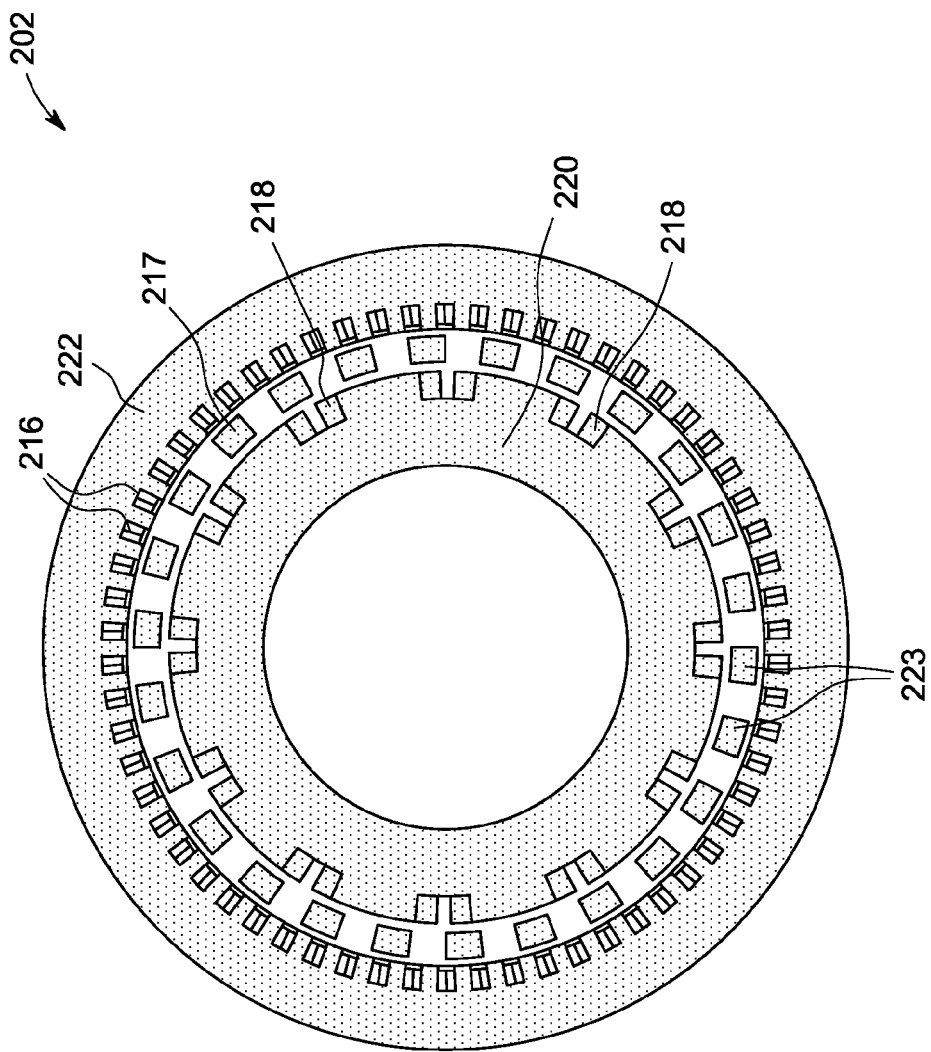

FIG. 2 is a schematic view of an exemplary variable speed machine assembly 200 that may be used with wind turbine 100 (shown in FIG. 1). FIG. 3 is a cross-sectional view of an exemplary first machine 202 that may be used with variable speed machine assembly 200. Variable speed machine assembly 200 includes a first machine 202, a second machine 204, and a power converter 208. In the exemplary embodiment, input shaft 134 extends through second machine 204 to first machine 202. Alternatively, second machine 204 is included within first machine 202 and input shaft 134 extends to the combined machine. Physically there is no difference between separate machines 202 and 204 and the combined machine because all components rotate with the same speed. In the exemplary embodiment, power converter 208 is coupled to first machine 202 using multi-phase leads 210 and to second machine 204 using multi-phase leads 212. Multi-phase leads 212 extend between power converter 208 and second machine 204 and include circuit breakers 214.

First machine 202 is also referred to herein as a variable-speed magnetically geared generator (MGG). In the exemplary embodiment, MGG 202 includes a first set of windings 216, a rotor 217, a second set of windings 218, a first stator 222, and a second stator 220. Rotor 217 includes a plurality of soft magnetic pole pieces 223. In the exemplary embodiment, a number of pole pairs of rotor 217 and stators 220 and 222 are design variables of variable speed machine assembly 200 and/or wind turbine 100. A selected nominal input speed is also a design variable of variable speed machine assembly 200 and/or wind turbine 100. More specifically, according to the selected number of pole pairs and the input speed, in one embodiment, converter 208 only feeds power to first machine 202, and thus second machine 204 acts as a generator only. In an alternate embodiment, second machine 204 only acts as a motor and converter 208 only feeds power to second machine 204. In the exemplary embodiment, second machine 204 acts as a motor and a generator.

Further, a selection of the input speed and pole pair numbers for stators 220 and 222 enables adjustment of a speed where a lowest power is transferred through converter 208, which is the point of highest system efficiency. Because wind turbine 100 usually operates at a certain wind speed, which can be described with the statistical Weibull wind speed distribution, it is possible to adjust first machine 202 to operate most efficiently at the certain wind speed, and increasing the overall produced energy. Moreover, for a given power rating of machine assembly 200 and a given number of pole pairs of first set of windings 216 and second set of windings 218, a higher nominal machine input speed decreases an amount of required converter power rating, but increases a torque and, thus, a size of the electromagnetic design.

Main shaft assembly 108 extends to rotor 217. First set of windings 216 are coupled to first stator 222 and coupled to a power grid 224 via circuit breakers 226. Second set of windings 218 is coupled to second stator 220 and to power converter 208. As used herein with reference to rotors and stators, the term "coupled to" or variations thereof include attaching, directly or indirectly, at least two separate parts together and/or integrally-forming at least two parts with each other. In the exemplary embodiment, MGG 202 is configured to divide mechanical power input into two portions of power. More specifically, first set of windings 216 is configured to feed a first portion of power to grid 224 at a constant frequency, and second set of windings 218 is configured to feed a second portion of power to power converter 208 at a variable frequency. Second set of windings 218 is also configured to receive electrical power from power converter 208. In one embodiment, the second portion of power is fed intermittently to power converter 208 when main shaft assembly 108 experiences a mechanical rotational speed transient, for example, during a gust of wind.

In the exemplary embodiment, variable-speed mechanical power input to MGG 202 is transformed into constant-frequency electric power at first set of windings 216, and is transformed into variable-frequency electric power at second set of windings 218. The frequency and power variability at second set of windings 218 accounts for the speed variability of input shaft 134. More specifically, the amount of power transferred from second set of windings 218 to second machine 204 accounts for the speed variability of input shaft 134 and/or main shaft assembly 108 because a relationship between the frequency of sets of windings 216 and 218 and speed of input shaft 134 is linear and follows the rules of an electromagnetic planetary gear.

More specifically, first set of windings 216 has $P_S$ pole-pairs, and a winding electrical frequency is $\omega_S$. Second set of windings 218 has $P_R$ pole-pairs, and a winding electrical frequency is $\omega_R$. A rotating set of soft magnetic pole pieces 223 includes $N_M$ modulator pole pieces, and a rotation speed is defined as $\Omega_M$. In the exemplary embodiment, $N_M = P_S \pm P_R$. An equivalent rotational speed of first set of windings 216 is defined $\Omega_S = \omega_S/P_S$, and an equivalent rotational speed of second set of windings 218 is defined as $\Omega_R = \omega_R/P_R$. A gearing ratio i is defined as $i = P_S/P_R$.

From the speed equations for a mechanical planetary gear set, the gearing ratio can be defined as $$i = \frac{\Omega_R - \Omega_M}{\Omega_S - \Omega_M},$$

where for mechanical planetary gears, R is a sun gear, M is a planet carrier, and S is a ring gear. Reformulated, this becomes $\Omega_R - \Omega_M = i\Omega_S - i\Omega_M$, and substituting variables gives $$\frac{\omega_R}{P_R} - i\frac{\omega_S}{P_S} = (1-i)\Omega_M.$$

For a grid connected machine where first set of windings 216 has a frequency fixed at $\omega_S = \omega_{grid}$, then a resulting electrical frequency $\omega_R$ of second set of windings 218 is calculated as $$\omega_R = \left[(1-i)\Omega_M + i\frac{\omega_{grid}}{P_S}\right] \cdot P_R.$$

The power balances of power $W_E$ of second machine 204 and power $W_R$ of second set of windings 218 can be defined as $W_E + W_R = 0$, $$T_E \cdot \Omega_M + T_R \cdot \frac{\omega_R}{P_R} = 0, \text{ and } T_E \cdot \Omega_M + T_R \cdot \left((1-i)\cdot\Omega_M + \frac{\omega_S}{P_R}\right) = 0.$$

The power balance of mechanical input power $W_M$ and electrical power $W_S$ fed into grid 224 by first set of windings 216 can be defined as $W_M + W_S = 0$ and $$T_M \cdot \Omega_M + T_S \cdot \frac{\omega_S}{P_S} = 0.$$

The torque balance is defined as $T_M + T_S + T_E + T_R = 0$. Inserting the power balances into the torque balance solves the equations for the various torque components based on the rules of an electromagnetic planetary gear as follows:

$$T_R = T_M \cdot \frac{\frac{\Omega_M \cdot P_S}{\omega_R} - 1}{i + \frac{\omega_S}{P_R \cdot \Omega_M}}$$

$$T_E = -T_R \cdot \frac{\omega_R}{P_R \cdot \Omega_M}$$

$$T_S = -T_M \cdot \Omega_M \cdot \frac{P_S}{\omega_S}$$

In the exemplary embodiment, the second portion of electric power associated with second set of windings 218 is converted by power converter 208 and fed into second machine 204, as described in more detail below. The power transfer between second set of windings 218 and second machine 204 is bidirectional and, as such, second machine 204 also transfers power to second set of windings 218 of MGG 202 via power converter 208.

Second machine 204 includes a permanent magnet excited machine, also referred to herein as an "exciter" and/or an "electrical machine". Electrical machine 204 is operable as a motor and/or a generator, as described in more detail herein. In the exemplary embodiment, electrical machine 204 includes a rotor 228, a stator 230 including a permanent magnet, and a set of windings 232. Alternatively, rotor 228 includes a permanent magnet, rather than stator 230 including a permanent magnet. However, in such an embodiment, slip rings may be used. In the exemplary embodiment, rotor 228 is coupled to input shaft 134 for rotation of rotor 228. Alternatively, second machine 204 is combined with first machine 202. In the exemplary embodiment, electrical machine 204 is configured to produce electric energy to control an output frequency of MGG 202. More specifically, electrical machine 204 is configured to control a frequency of the power output by first set of windings 216 to be substantially at a grid terminal frequency, such as 50 Hertz (Hz) or 60 Hz.

Power converter 208 is a partial-rated converter. For example, power converter is rated between about 4% of rated capacity and about 15% of the rated capacity of wind turbine 100 (shown in FIG. 1). In the exemplary embodiment, power converter 208 is coupled to second set of windings 218 of MGG 202 and set of windings 232 of electrical machine 204 and is configured to bidirectionally transfer electrical power between second set of windings 218 of MGG 202 and set of windings 232 of electrical machine 204. When stator 230 of electrical machine 204 includes a permanent magnet, power converter 208 rotates with input shaft 134 and/or rotor 228 of electrical machine 204. In an alternative embodiment, electrical machine 204 can include a slip ring and/or any other suitable device for transferring signals and/or power between a stationary component and a rotating component. Alternatively, when rotor 228 includes a permanent magnet, power converter 208 is stationary, and no slip rings are required.

In the exemplary embodiment, power converter 208 is configured to adjust a frequency of electrical machine 204 to maintain a frequency of power output from first set of windings 216 of MGG 202 at a substantially constant value, such as a value substantially equal to the grid terminal frequency. For example, power converter 208 supplies electrical power from electrical machine 204 to MGG 202 at a frequency that maintains the output power frequency at substantially the grid terminal frequency. During certain operational conditions, power converter 208 controls a frequency of second set of windings 218 of stator 220 of MGG 202 such that a substantially constant angular velocity of input shaft 134 can be maintained. More specifically, machine assembly 200 can be operated to rotate main shaft assembly 108 as a predetermined speed depending on produced electrical power.

During normal operating conditions, MGG 202 and electrical machine 204 act as generators—MGG 202 generates power to be fed to grid 224, and electrical machine 204 generates power to be fed to MGG 202 via power converter 208. In the exemplary embodiment, power converter 208 is configured to receive electrical power from electrical machine 204, adjust a frequency of the received electrical power, and output the adjusted electrical power to MGG 202 to control the frequency of the power output by MGG 202. More specifically, power converter 208 uses electrical power from electrical machine 204 to adjust a rotation of a magnetic field within MGG 202. By adjusting a speed and/or a direction of magnetic field rotation with respect to mechanical rotation of input shaft 134 in MGG 202, power converter 208 adjusts the frequency of power output to grid 224 to substantially the grid terminal frequency. In the exemplary embodiment, a frequency of electrical power output from electrical machine 204 is adjusted by power converter 208 based on a differential rotational speed within MGG 202, a gear ratio, a slip, and/or any other suitable parameter before being fed to MGG 202.

During mechanical power input transients, variable frequency electrical power is transferred from MGG 202 to electrical machine 204 via power converter 208, and electrical machine 204 acts as a motor to drive MGG 202 for maintaining power output at the grid terminal frequency. More specifically, in the exemplary embodiment, power converter 208 is configured to receive variable-frequency electrical power from MGG 202, adjust the variable-frequency electrical power, and output the adjusted electrical power to electrical machine 204 to control a rotation of input shaft 134 at electrical machine 204 to control MGG 202.

To make, assemble, and/or otherwise manufacture variable speed machine assembly 200, MGG 202 is coupled to main shaft assembly 108 and power grid 224. More specifically, first set of windings 216 is coupled to grid 224. Electrical machine 204 is coupled to input shaft 134. More specifically, rotor 228 is coupled to input shaft 134. Further, power converter 208 is coupled to MGG 202 and electrical machine 204. More specifically, second set of windings 218 and set of windings 232 are coupled to power converter 208. Second set of windings 218 and set of windings 232 are configured to transmit power to, and receive power from, power converter 208.

The embodiments described herein provide variable speed operation with power electronics limited to a fraction of a rating capacity. More specifically, the variable speed machine assembly described herein includes a partial-rated power converter coupled to a variable-speed magnetically geared generator and an exciter. As such, the variable speed machine assembly has less power electronics and increased reliability, as compared to variable speed machines having a full-rated power converter. Further, it may be possible to eliminate a transformer since the herein-described machine assembly can be at grid voltage. Moreover, the variable speed machine assembly described herein eliminates the use of a slip ring, as is used in a DFIG. Additionally, the embodiments described herein have superior efficiency and better reactive power control, as compared to DFIGs.

Exemplary embodiments of a variable speed machine assembly and method for making the same are described above in detail. The methods and apparatus are not limited to the specific embodiments described herein, but rather, components of systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable speed machine assembly comprising:
    an input shaft;
    a variable speed magnetically geared generator coupled to said input shaft;
    an electrical machine coupled to said input shaft; and
    a power converter coupled to said variable speed magnetically geared generator and said electrical machine, said power converter configured to use electrical power output by said electrical machine to control a frequency of power output by said variable speed magnetically geared generator.

2. A variable speed machine assembly in accordance with claim 1, wherein said variable speed magnetically geared generator comprises:
    a rotor coupled to said input shaft;
    a first set of windings coupled to a grid and configured to output substantially constant-frequency electrical power to the grid; and
    a second set of windings coupled to said power converter and configured to at least one of transfer electrical power to said power converter and receive electrical power from said power converter.

3. A variable speed machine assembly in accordance with claim 2, wherein said power converter is configured to output electrical power to said second set of windings to control the frequency of the power output by said first set of windings.

4. A variable speed machine assembly in accordance with claim 1, wherein said electrical machine comprises:
    a rotor coupled to said input shaft; and
    a set of windings coupled to said power converter and configured to at least one of transfer electrical power to said power converter and receive electrical power from said power converter.

5. A variable speed machine assembly in accordance with claim 4, wherein said electrical machine further comprises a stator including a permanent magnet.

6. A variable speed machine assembly in accordance with claim 1, wherein said power converter is configured to:
    receive electrical power from said electrical machine;
    adjust a frequency of the received electrical power; and
    output the adjusted electrical power to said variable speed magnetically geared generator to control the frequency of the power output by said variable speed magnetically geared generator.

7. A variable speed machine assembly in accordance with claim 1, wherein said power converter is configured to:
    receive variable-frequency electrical power from said variable speed magnetically geared generator;
    adjust the variable-frequency electrical power; and
    output the adjusted electrical power to said electrical machine to control a rotation of said input shaft at said electrical machine to control said variable speed magnetically geared generator.

8. A turbine comprising:
    a main shaft assembly including an input shaft;
    at least one blade coupled to said main shaft assembly and configured to rotate said main shaft assembly; and
    a variable speed machine assembly coupled to said main shaft assembly, the variable speed machine assembly comprising:
        a variable speed magnetically geared generator coupled to said input shaft;
        an electrical machine coupled to said input shaft; and
        a power converter coupled to said variable speed magnetically geared generator and said electrical machine, said power converter configured to use electrical power output by said electrical machine to control a frequency of power output by said variable speed magnetically geared generator.

9. A turbine in accordance with claim 8, wherein said variable speed magnetically geared generator comprises:
 a rotor coupled to said input shaft;
 a first set of windings coupled to a grid and configured to output substantially constant-frequency electrical power to the grid based on a mechanical rotation of said main shaft assembly; and
 a second set of windings coupled to said power converter and configured to at least one of transfer electrical power to said power converter and receive electrical power from said power converter.

10. A turbine in accordance with claim 9, wherein said power converter is configured to output electrical power to said second set of windings to control the frequency of the power output by said first set of windings.

11. A turbine in accordance with claim 9, wherein said power converter is configured to adjust at least one of a speed and a direction of rotation of a magnetic field within said variable speed magnetically geared generator with respect to a mechanical rotation of said input shaft within said variable speed magnetically geared generator.

12. A turbine in accordance with claim 8, wherein said electrical machine comprises:
 a rotor coupled to said input shaft; and
 a set of windings coupled to said power converter and configured to at least one of transfer electrical power to said power converter and receive electrical power from said power converter.

13. A turbine in accordance with claim 12, wherein said electrical machine further comprises a stator, one of said rotor and said stator comprising a permanent magnet.

14. A turbine in accordance with claim 8, wherein said power converter is configured to:
 receive electrical power from said electrical machine;
 adjust a frequency of the received electrical power; and
 output the adjusted electrical power to said variable speed magnetically geared generator to control the frequency of the power output by said variable speed magnetically geared generator.

15. A turbine in accordance with claim 8, wherein said power converter is configured to:
 receive variable-frequency electrical power from said variable speed magnetically geared generator;
 adjust the variable-frequency electrical power; and
 output the adjusted electrical power to said electrical machine to control a rotation of said input shaft at said electrical machine to control said variable speed magnetically geared generator.

16. A method for making a variable speed machine assembly, said method comprising:
 coupling a variable speed magnetically geared generator to an input shaft and a power grid;
 coupling an electrical machine to the input shaft; and
 coupling a power converter to the variable speed magnetically geared generator and the electrical machine, the power converter configured to use electrical power output by the electrical machine to control a frequency of power output to the grid by the variable speed magnetically geared generator.

17. A method in accordance with claim 16, wherein the variable speed magnetically geared generator includes a first set of windings and a second set of windings, said method further comprising:
 coupling the first set of windings to the grid, the first set of windings configured to output the power to the grid; and
 coupling the second set of windings to the power converter, the second set of windings configured to at least one of transfer electrical power to the power converter and receive electrical power from the power converter.

18. A method in accordance with claim 16, wherein the electrical machine includes a rotor and a set of windings, said method further comprising:
 coupling the rotor to the input shaft; and
 coupling the set of windings to the power converter, the set of windings configured to at least one of transfer electrical power to the power converter and receive electrical power from the power converter.

19. A method in accordance with claim 16, wherein coupling a power converter to the variable speed magnetically geared generator and the electrical machine further comprises coupling the power converter to the variable speed magnetically geared generator and the electrical machine, wherein the power converter is configured to receive electrical power from the electrical machine, adjust a frequency of the received electrical power, and output the adjusted electrical power to the variable speed magnetically geared generator to control the frequency of the power output by the variable speed magnetically geared generator.

20. A method in accordance with claim 16, wherein coupling a power converter to the variable speed magnetically geared generator and the electrical machine further comprises coupling the power converter to the variable speed magnetically geared generator and the electrical machine, wherein the power converter is configured to receive variable-frequency electrical power from the variable speed magnetically geared generator, adjust the variable-frequency electrical power, and output the adjusted electrical power to the electrical machine to control a rotation of the input shaft at the electrical machine to control the variable speed magnetically geared generator.

* * * * *